United States Patent [19]

Drexler et al.

[11] Patent Number: 5,635,994
[45] Date of Patent: Jun. 3, 1997

[54] METHOD OF MAKING A HIERARCHICAL ESTIMATE OF IMAGE MOTION IN A TELEVISION SIGNAL

[75] Inventors: Michael Drexler, Hemmingen; Heinz-Werner Keesen; Carsten Herpel, both of Hanover, all of Germany

[73] Assignee: Deutsche Thomson-Brandt GmbH, Villingen-Schwenningen, Germany

[21] Appl. No.: 351,585

[22] Filed: Dec. 7, 1994

[30] Foreign Application Priority Data

Dec. 11, 1993 [DE] Germany .................. 43 42 305.1

[51] Int. Cl.$^6$ ............................. H04N 7/32; H04N 7/50
[52] U.S. Cl. ................... 348/699; 348/416; 348/413
[58] Field of Search ........................ 348/699, 416, 348/413, 407, 408, 402, 396, 397, 398; H04N 7/32, 7/34, 7/36, 7/50

[56] References Cited

U.S. PATENT DOCUMENTS

| | | | |
|---|---|---|---|
| 4,771,331 | 9/1988 | Bierling et al. | 348/396 |
| 4,980,764 | 12/1990 | Henot | 348/397 |
| 5,128,756 | 7/1992 | Johnston et al. | 348/699 |
| 5,276,513 | 1/1994 | Van Der Wal et al. | 348/699 |
| 5,444,489 | 8/1995 | Truong et al. | 348/422 |
| 5,473,378 | 12/1995 | Tamitani | 348/699 |
| 5,477,272 | 12/1995 | Zhang et al. | 348/699 |

FOREIGN PATENT DOCUMENTS

| | | | |
|---|---|---|---|
| 368151 | 5/1990 | European Pat. Off. | H04N 7/30 |
| 460997 | 12/1991 | European Pat. Off. | G06F 15/70 |
| 446001 | 9/1992 | European Pat. Off. | H04N 7/32 |
| 558922 | 9/1993 | European Pat. Off. | |
| 4023449 | 1/1992 | Germany | H04N 7/30 |
| 2259827 | 3/1993 | United Kingdom | H04N 5/14 |
| 92/19068 | 10/1992 | WIPO | H04N 7/30 |

OTHER PUBLICATIONS

Srinivasan et al., *Predictive Coding Based on Efficient Motion Estimation*, IEEE Transactions on Communications, vol. Com. 33, No. 8, Aug. 1985.

*Multiscale Motion Estimation*, by B. Chupeau, published in Signal Processing of HDTV, III, 4 Sep. 1991, pp. 233–240.
*Hierarchical Coding Scheme of Video Signal with Scalability and Compatibility*, by T. Hanamura et al, published in Signal Processing Image Communication, Feb. 1993, pp. 159–184.
*A Fast Feature Matching Algorithm of Multi–Resolution Motion Estimation*, by X. Lee et al, published in Globecom '92, 6 Dec. 1992, pp. 320–324.
V. Venkateswar andR. Chellappa, "Hierarchical Feature Based Matching for Motion Correspondence", Visual Motion, 1991 IEEE Workshop, pp. 280–285.
V. Seferidis and M. Ghanbari, "Hierarchical Motion Estimation Using Texture Analysis", Image Processing and Its Applications (IEE Conf. Pub. 354), pp. 61–64.
M. Bierling, "Displacement Estimation by Hierarchical Blockmatching", SPIE vol. 1001, Visual Communications and Image Processing, 1988, pp. 942–950.
K.S. Seo and J.K. Kim, "Hierarchical Block–Motion Estimation Using Linear Model–Based Postprocessing", Electronics Letters, vol. 29, No. 22, Oct. 1993, pp. 1915–1916.
M.H. Ahmad Fadzil and T.J. Dennis, "A Hierarchical Motion Estimator for Interframe Coding", IEE Colloquium on Applications of Motion Compensation, Oct. 1990.
Yeu–Shen Jehng, Liang–Gee Chen and Tzi–Dar Chiueh, "An Efficient and Simple VLSI Tree Architecture for Motion Estimation Algorithms", IEEE Trans. on Sig. Proc., vol. 41, No. 2, Feb. 1993, pp. 889–900.

*Primary Examiner*—Howard W. Britton
*Assistant Examiner*—Vu Le
*Attorney, Agent, or Firm*—Joseph S. Tripoli; Ronald H. Kurdyla; Alexander J. Burke

[57] ABSTRACT

A method of making a hierarchical estimate of image motion for a television signal. A television signal video image is divided into blocks of fixed size, and motion relative to a second video image is determined for each block. Mutually non-overlapping pixel blocks are produced at a lower, more finely resolved hierarchical level. The center points of these blocks are used as the points for an analysis at a level that is located higher in the hierarchy. Preferably, points which lie between image lines and which do not represent real picture elements in the line raster, are investigated in the mutually non-overlapping blocks.

13 Claims, 2 Drawing Sheets

+ : pel   x : 1/2 - pel

+ : pel   x : 1/2 - pel   o : filtered pel

+ : 4-pel   x: pel

+ : 4-pel   x: pel    o : filtered 4-pel

METHOD OF MAKING A HIERARCHICAL ESTIMATE OF IMAGE MOTION IN A TELEVISION SIGNAL

BACKGROUND OF THE INVENTION

The invention concerns a method for estimating motion in a television signal between first and second video images. The purpose of estimating motion in a television signal is to reduce the amount of data transmitted. This reduces the required transmission bandwidth, transmission time and video recorder storage capacity. In accordance with the motion estimate, successive pictures are not transmitted completely as in the case of a conventional television signal. Instead, difference factors are transmitted which represent any alteration between successive pictures. A further usage of the motion estimate occurs in applications involving switching-over certain signal processing circuits, e.g. comb filters, as regards their manner of operation in dependence on image motion in the television signal. A motion estimate is also required in video cameras to electronically or mechanically balance out alterations which occur in the image due to unintentional shaking of the camera.

The greater the search range, the more effective is the estimate of the motion between video images. In order to reduce the amount of hardware which is associated with searches, a hierarchical search arrangement is adopted. Initially and in a relatively coarse manner, a best motion factor is sought throughout the whole search range. To improve this factor, a more finely resolved search is performed in the neighborhood of the location that has been found.

In the known "block matching algorithm" method of motion estimation, a video image that is to be processed is divided into blocks of fixed size. The motion with respect to a second video image is determined for each block in that an error magnitude (distortion) of the block is calculated for each possible displacement within a search range, and thereafter the minimum one of the values is determined.

The implementation in hardware is based on commercially available motion estimation integrated circuits such as the STI3220 device type commercially available from SGS-Thomson for example. This module computes the displacement having the least distortion in a search range of −8/+7 points (pixels) horizontally and vertically. The search range can be enlarged by cascading a plurality of integrated circuits. For high resolution HDTV systems, and for video images in accordance with the MPEG standard in which motion between images lying further apart in time is computed, as large a search range as possible is desired. This is to estimate the motion and determine displacements with a resolution of ½ pel (pel =pixel =picture element). With "full search block matching", in which each possible displacement requires a parallel arithmetic unit, several hundred modules may be required even when using the integrated motion estimation chips.

SUMMARY OF THE INVENTION

The amount of circuitry required can be reduced by estimating motion in a hierarchical manner. By this method, firstly, the whole search range is investigated using a reduced resolution. Then the smallest distortion effect is determined using a higher resolution around the position having the lowest distortion. This process can be repeated as often as desired using ever finer resolutions.

The object of the invention is to reduce the amount of circuitry which is required for motion estimation. In accordance with the principles of the invention, mutually non-overlapping pixel blocks are selected at the lower, more finely resolved hierarchical level. The center points of these blocks are used as the points for an analysis at a level that is located higher in the hierarchy. Preferably, points which lie between image lines and which do not represent real pixels in the line raster are investigated in the mutually non-overlapping pixel blocks.

DETAILED DESCRIPTION OF THE DRAWINGS

Figure 1:
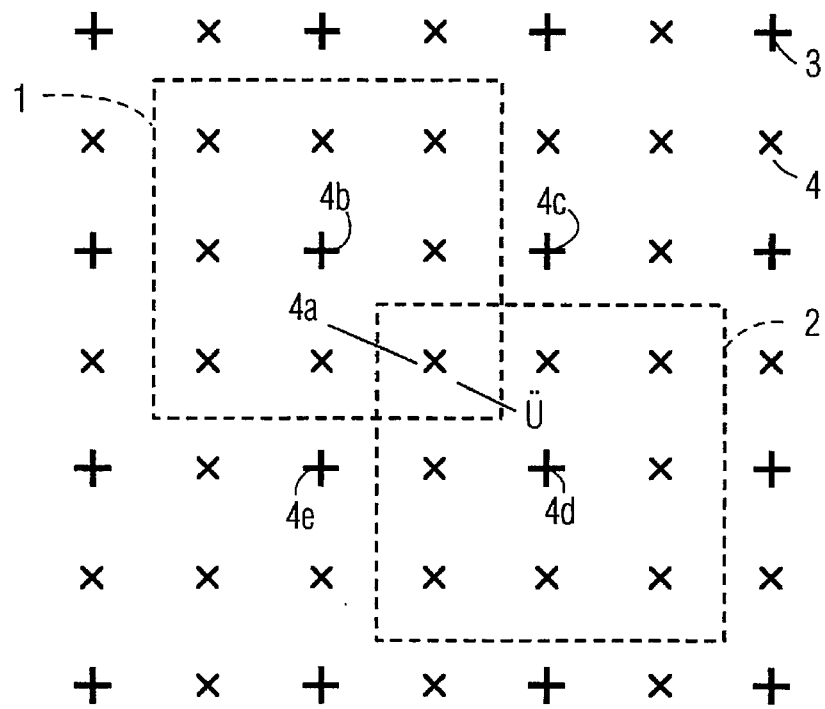
FIG. 1 shows an example of a known method of motion estimation.

FIG. 1 shows two blocks 1, 2 having an overlapping area U. When making an estimate of motion in a first hierarchical step, only the boldly marked crosses 3 (+) are investigated. If, for example, point 4a appears to be optimal, only points 4b, 4c, 4d, 4e surrounding this point need be considered. Then an evaluation in the neighborhood of these points is performed. As FIG. 1 depicts, this would be the respective eight points in one of the blocks 1, 2 represented by the lightly marked crosses 4 (X). This means that, in the second hierarchical step, the amount of circuitry required has to be sufficient for these eight points. FIG. 1 thus shows an example involving a first search using a one picture element (pel) resolution and a subsequent search using ½ pel resolution around the first found pel. It is apparent that the ½ pel search blocks around the one pel resolution evaluation points (4b, 4d) overlap. Each ½ pel value falls within at least two hierarchical search blocks. The ½ pel diagonals fall within four search blocks.

Figure 2:
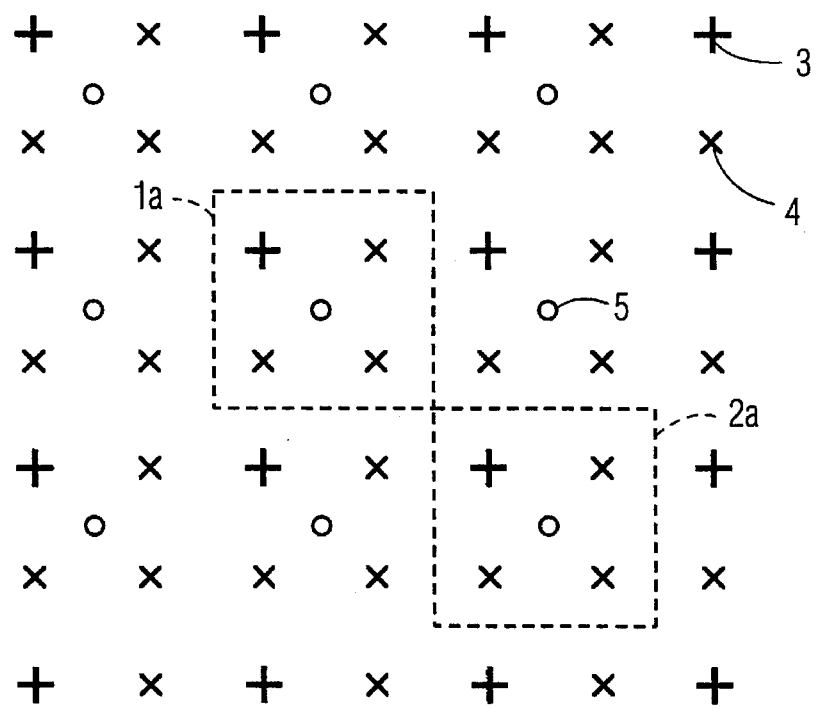
FIG. 2 shows the method of motion estimation in accordance with the principles of the invention.

In FIG. 2, blocks 1a and 2a no longer have any overlapping areas. Consequently, each point lies unambiguously in a single search block. In the first hierarchy, points 5 represented by the circles are investigated. This is in contrast to FIG. 1 where points 3 represented by the crosses are investigated. Then, in the second hierarchical step, four points around points 5 are investigated in each case. It is apparent that now only four points have to be investigated, not eight as in FIG. 1. The amount of circuitry required, is consequently reduced by approximately this factor (4/8).

Points 5 are no longer actual picture elements since they lie outside the line raster illustrated in FIG. 1. The amount of circuitry required for the investigation of these points 5 is, however, relatively low. It merely consists of a filter, in which the values of these points are added and the resulting sum is divided by 4. In other words, a formation of the real average value of these four points is carried out. Thus, in the first hierarchical step, the original pel-values are replaced by filtered pel-values. In the second hierarchical step, a search in the neighborhood of these filtered values is performed. The method may also be applied to multi-level hierarchical schemes.

Figure 3:
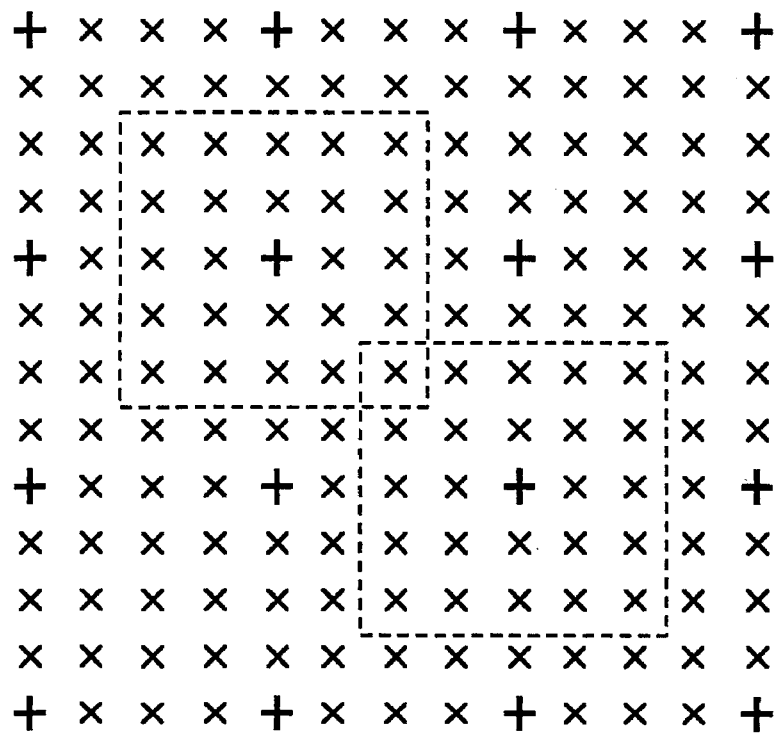
FIG. 3 shows a 4-pel resolution example at an upper level of the hierarchy.

FIG. 3 shows a 4-pel resolution example at an upper level of the hierarchy and a subsequent pel resolution in accordance with the conventional method. Here, 24 positions have to be analyzed in the lower levels of the hierarchy.

Figure 4:
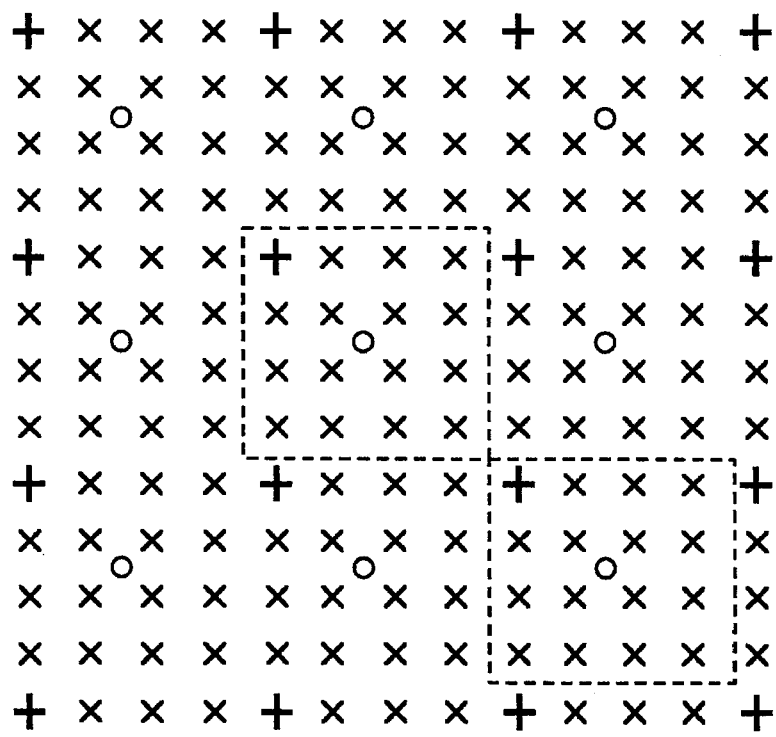
FIG. 4 shows an example of how filtered values are computed.

In contrast, FIG. 4 again shows the embodiment using mutually non-overlapping blocks. At the upper level of the hierarchy, average pixel (4-pel values) values are computed as before, which lie at the center of 4 ×4 pixel blocks. The average values are computed by summing the 4 pixel values surrounding the center point and then dividing this sum by four. Then a search is performed in the neighborhood of the filtered 4-pel value which has been found to have the lowest distortion. In this search only 16 pixels are now involved.

The method in accordance with the principles of the invention is not restricted to motion estimation but can be used anywhere hierarchical structures are employed. In applying the method, mutually non-overlapping blocks are selected at lower, more finely resolved hierarchical levels. The central points of these blocks are used as the points for analysis at a higher hierarchical level.

What is claimed is:

1. A method of making a hierarchical estimate of image motion in a video signal representing a video image, comprising the steps of:
   (a) selecting first fixed size blocks picture elements (pixels) arranged in a grid in a first video image area;
   (b) dividing said first video image area into said first fixed size pixel blocks in a first hierarchical level;
   (c) determining motion of said first fixed Size pixel blocks relative to a second video image;
   (d) selecting mutually non-overlapping blocks of more finely resolved pixels in a second hierarchical level based on said motion of said first fixed size pixel blocks;
   (e) dividing said first fixed size pixel blocks into said mutually non-overlapping blocks;
   wherein center points of said non-overlapping blocks are not original pixels in said grid; and
   (f) comparing said non-overlapping blocks with blocks of said second video image.

2. The method in accordance with claim 1, wherein step a) includes the step of
   interpolating between pixels of said first video image area to obtain in intermediate pixels as said center points.

3. The method defined in claim 1, wherein step (d) comprises;
   dividing said selected pixel block into non-overlapping pixel blocks with center points which are intermediate between pixels used in computing said displacement of said first size blocks.

4. A method of making a hierarchical estimate of image motion produced by a video signal representative of successive video images, said method comprising the steps of:
   (a) dividing a first video image area contianing pixels arranged in a grid into pixel blocks of a first size;
   (b) computing the displacement of said first size pixel blocks of said first video image area relative to a second video image;
   (c) selecting one of said first size pixel blocks of Said first video image area on the basis of said computed displacement;
   (d) dividing said selected pixel block into non-overlapping pixel blocks of a second size with center points which are intermediate between original pixels in said grid;
   (e) computing the displacement of said second size blocks of said first video image area relative to said second video image; and
   (f) selecting a computed displacement value.

5. The method defined in claim 4, wherein:
   steps (c), (d), (e), and (f) are repeated one or more times wherein said first size blocks and said second size blocks become respectively third size blocks and fourth size blocks on a second iteration, and fifth size blocks and sixth size blocks on a third iteration etc.

6. The method defined in claim 3, wherein step (d) comprises
   dividing said selected pixel block into non-overlapping pixel blocks with center points which are intermediate between pixels used in computing said displacement said first size blocks.

7. The method defined in claim 4, wherein:
   in step (a) said first video image area, is divided into overlapping pixel blocks.

8. The method defined in claim 4, wherein step (a) include the step of interpolating between pixels of said first video image area to obtain said center points.

9. The method defined in claim 4, wherein:
   step (a) comprises the step of dividing said first video image area into non-overlapping pixel blocks of said first size.

10. A method of making a hierarchical estimate of image motion produced by a video signal representative of successive video images, said method comprising the steps of:
    (a) dividing a first video image area to non-overlapping search blocks a first Size with center points that are not original values of said first video image area, but are derived from original values using an arithmetic operation;
    (b) comparing said first size blocks of said first video image area with a block of a second video image to determine a best matching block;
    (c) dividing said best matching block of said first video image into search blocks of a second size:
    (d) comparing said second size blocks of said first video image are with a second block of said second video image to determine a second best matching block; and
    (e) deriving a vector for identifying said second best matching block relative to said second video image.

11. A method of making a hierarchical estimate of image motion for an image produced by a video signal representative of successive video images, said method comprising the steps of:
    (a) dividing a first video image area containing pixels arranged in a grid into pixel blocks of a first size;
    (b) dividing a second video image into pixel blocks of a first size;
    (c) computing the displacement of said first size pixel blocks of said first video image area relative to said first size pixel blocks of said second video image;
    (d) selecting one of said first size pixel block of said first video image area on the basis of said computed displacement;
    (e) dividing said selected pixel block into non-overlapping pixel blocks of a second size with center points which are intermediate between pixels in said grid, said second size including said first size;

(f) dividing an area of said second video image into blocks of a second size;

(g) computing the displacement said second size pixel blocks of said first video image area relative to said second size pixel blocks of said second video image area; and (h) selecting a computed displacement value from step (g).

12. The method defined in claim 11, wherein step (e) comprises:

dividing said selected pixel block into non-overlapping pixel blocks with center points which are intermediate between pixels used in computing said displacement of said first size blocks.

13. The method defined in claim 11, wherein step (a) includes the step of interpolating between pixels of said first video image area to obtain said center points.

* * * * *

UNITED STATES PATENT AND TRADEMARK OFFICE
CERTIFICATE OF CORRECTION

PATENT NO. : 5,635,994

DATED : June 3, 1997

INVENTOR(S) : Michael Drexler, et al.

It is certified that error appears in the above-identified patent and that said Letters Patent is hereby corrected as shown below:

In the claims:

Claim 1, column 3, line 19, after the word "blocks" insert the word --of--.

Claim 1, column 3, line 24, delete the word "Size" and insert the word --size--.

Claim 2, column 3, line 40, delete the word "in".

Claim 4, column 3, line 57, delete the word "Said" and insert word --said--.

Claim 6, column 4, line 9, delete "3" and insert --4--.

Claim 7, column 4, line 17, delete ",".

Claim 8, column 4, line 19, delete the word "include" and insert the word --includes--.

Signed and Sealed this

Sixth Day of October, 1998

*Attest:*

BRUCE LEHMAN

*Attesting Officer*  *Commissioner of Patents and Trademarks*